(12) United States Patent  (10) Patent No.: US 12,134,119 B2
Sorkin  (45) Date of Patent: Nov. 5, 2024

(54) STRAND CUTTER

(71) Applicant: Felix Sorkin, Stafford, TX (US)

(72) Inventor: Felix Sorkin, Stafford, TX (US)

(*) Notice: Subject to any disclaimer, the term of this patent is extended or adjusted under 35 U.S.C. 154(b) by 762 days.

(21) Appl. No.: 17/135,318

(22) Filed: Dec. 28, 2020

(65) Prior Publication Data

US 2021/0237142 A1 Aug. 5, 2021

Related U.S. Application Data

(60) Provisional application No. 63/006,202, filed on Apr. 7, 2020, provisional application No. 62/968,789, filed on Jan. 31, 2020.

(51) Int. Cl.
B21F 11/00 (2006.01)
B23D 29/00 (2006.01)
B23D 29/02 (2006.01)

(52) U.S. Cl.
CPC ............ B21F 11/00 (2013.01); B23D 29/002 (2013.01); B23D 29/023 (2013.01)

(58) Field of Classification Search
CPC ..... B21F 11/00; B23D 29/002; B23D 29/023; B23D 33/02; B23D 21/00; B23D 21/04; B23D 21/10
See application file for complete search history.

(56) References Cited

U.S. PATENT DOCUMENTS 3,279,059 A * 10/1966 Keiter .................... B23D 21/10
  30/96
3,379,080 A * 4/1968 Massa .................... B23D 21/10
  82/72
5,042,337 A 8/1991 Rodriquez
5,054,342 A * 10/1991 Swiatowy .............. B23D 21/04
  82/147
2001/0022029 A1 9/2001 Vary
2007/0033812 A1 2/2007 Kimura
(Continued)

FOREIGN PATENT DOCUMENTS

CN 207256594 U * 4/2018

OTHER PUBLICATIONS

CN_108213553_A (Year: 2018).*
(Continued)

*Primary Examiner* — Jonathan G Riley
(74) *Attorney, Agent, or Firm* — Hunton Andrews Kurth LLP

(57) ABSTRACT

A strand cutter includes a drive assembly and a clamp assembly. The strand cutter includes a nose piece. The nose piece includes a nose piece body, a shoulder, a fixed blade receptacle and a rotating blade receptacle. The strand cutter includes a fixed blade received in the fixed blade receptacle and a rotating blade assembly. The rotating blade assembly includes a cylindrical cutting body, a replaceable shear blade or a cutting edge, and a drive gear engagement coupled to or integrated with the cutting body. The drive gear engagement engages the drive assembly so as to allow the transmission of torque from the drive assembly to the blade mount, the blade mount coupled to or integrally formed with the cutting body. The strand cutter also includes a flange plate, wherein the flange plate receives the shoulder. The flange plate retains the nose piece in engagement to the drive assembly.

13 Claims, 9 Drawing Sheets

(56) References Cited

U.S. PATENT DOCUMENTS

| | | | |
|---|---|---|---|
| 2009/0165306 A1* | 7/2009 | Nasiell | B23D 21/04 30/101 |
| 2010/0236080 A1* | 9/2010 | Huang | B23D 29/023 30/251 |
| 2015/0052761 A1 | 2/2015 | Jager | |
| 2018/0326600 A1 | 11/2018 | Wason et al. | |

OTHER PUBLICATIONS

Extended European Search Report issued in EP App. No. 21151164.7-1017, dated Jun. 24, 2021 (9 pages).
https://precision-hayes.com/pdfs/16-030000414_strand_shearing.pdf ; "PS-Series, PocketShear"; (online brochure available at least as early as Jan. 29, 2020); 2 pages.

* cited by examiner

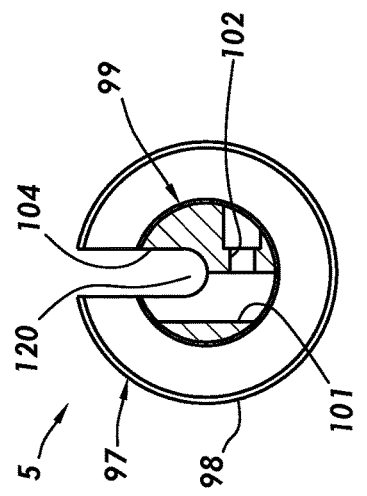
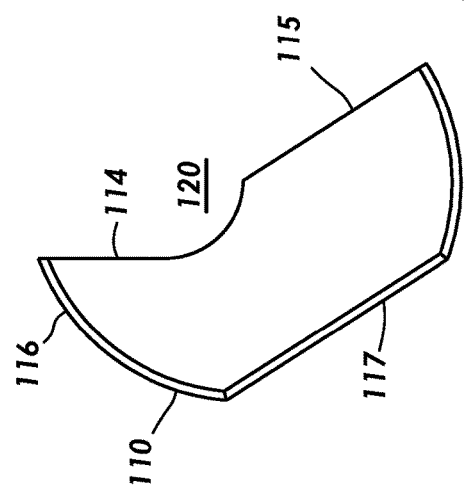
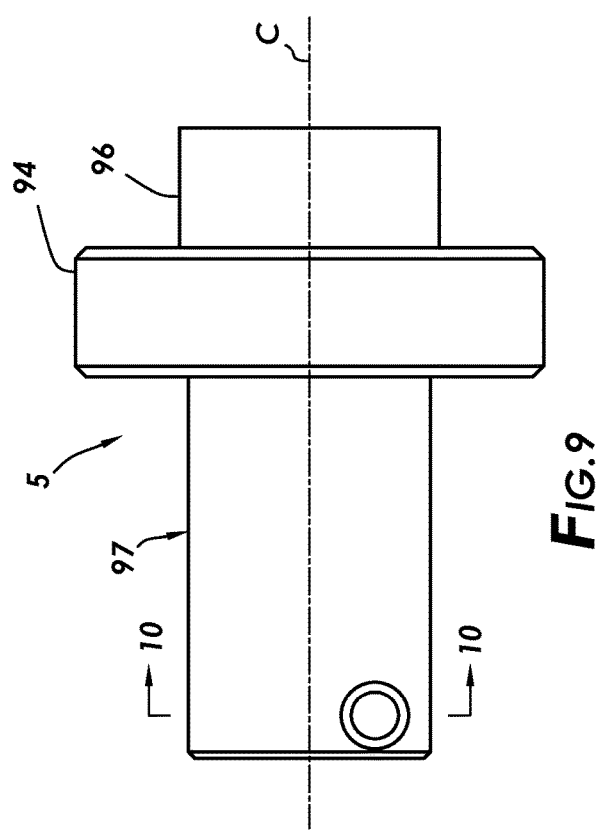
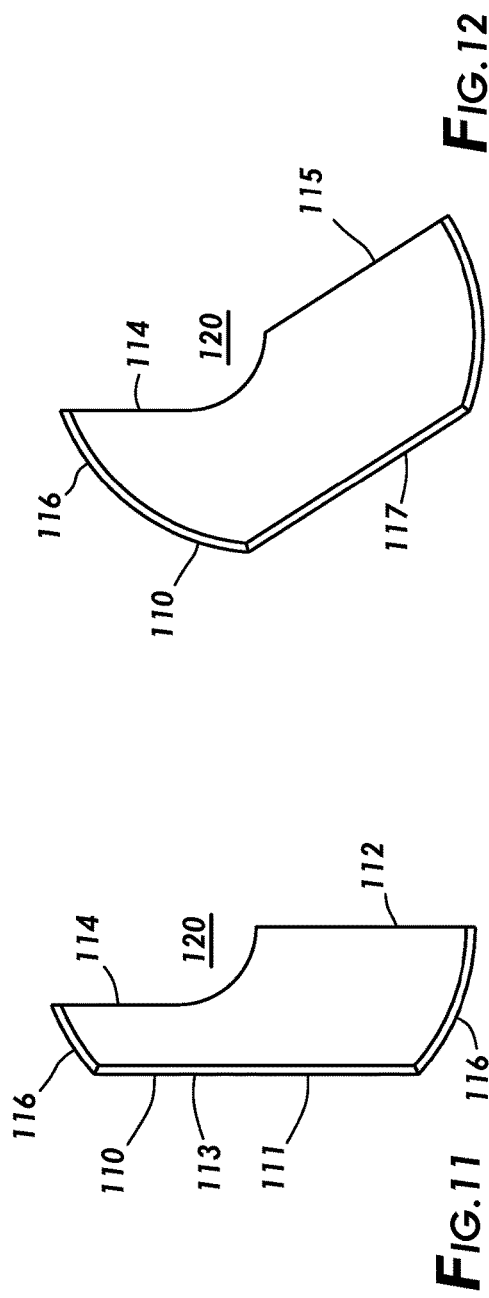

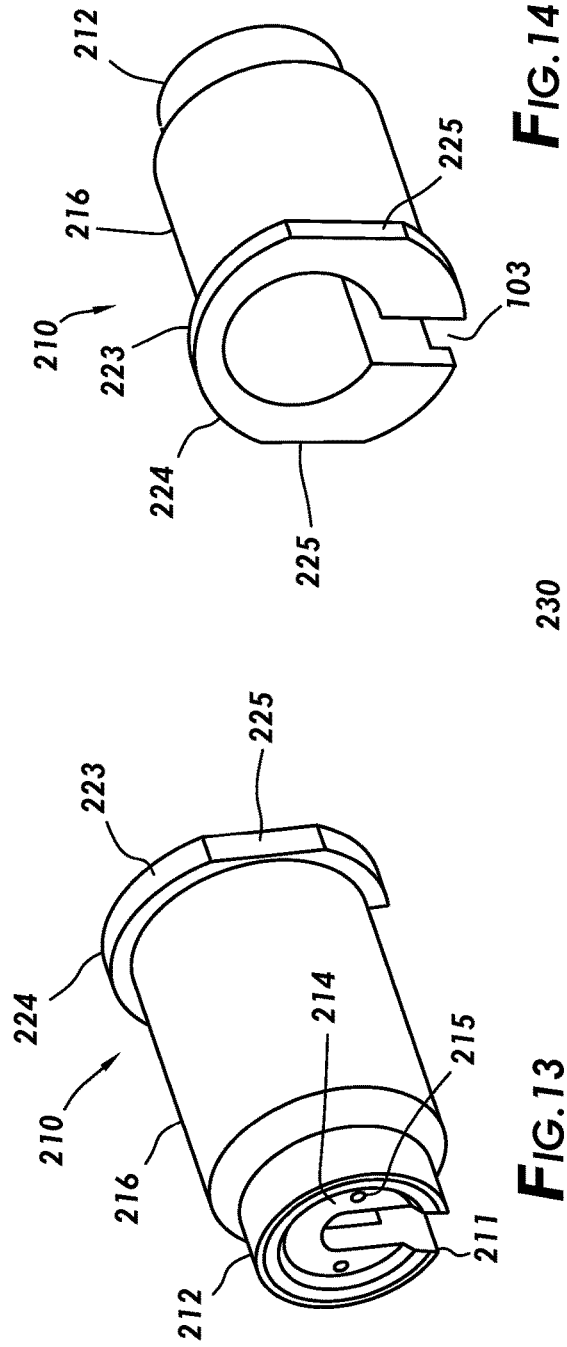
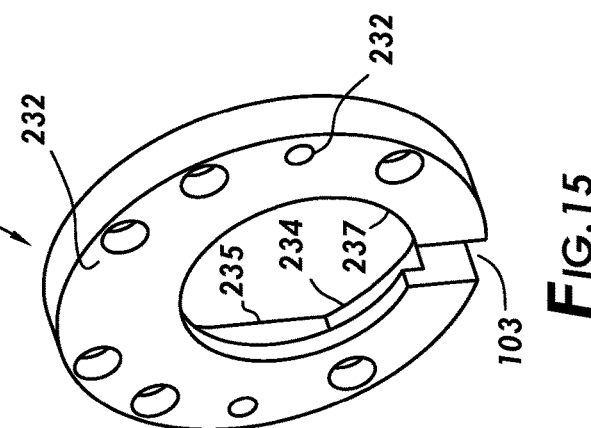

STRAND CUTTER

CROSS-REFERENCE TO RELATED APPLICATIONS

This application is a nonprovisional application which claims priority from U.S. provisional application No. 62/968,789, filed Jan. 31, 2020, and U.S. provisional application No. 63/006,202 filed Apr. 7, 2020, each of which is incorporated by reference herein in its entirety.

TECHNICAL FIELD/FIELD OF THE DISCLOSURE

The present disclosure is directed to a device for shearing a cable.

BACKGROUND OF THE DISCLOSURE

Many structures are built using concrete, including, for instance, buildings, parking structures, apartments, condominiums, hotels, mixed-use buildings, casinos, hospitals, medical buildings, government buildings, research/academic institutions, industrial buildings, malls, bridges, pavement, tanks, reservoirs, silos, foundations, sports courts, and other structures.

Pre-stressed concrete is structural concrete in which internal stresses are introduced to reduce potential tensile stresses in the concrete resulting from applied loads. This can be accomplished by two methods—pre-tensioned pre-stressing and post-tensioned pre-stressing. When post-tensioning concrete, the pre-stressing assembly is tensioned after the concrete has cured to a specified strength. The pre-stressing assembly, commonly known as a tendon, may include for example and without limitation, anchorages, one or more strands, and sheaths or ducts surrounding the strand(s). A strand may be tensioned between a pair of anchors, which are embedded in the concrete. The strand may be formed from a metal or composite or any suitable material exhibiting tensile strength, including, for example and without limitation, reinforcing steel, single wire cable, or multi-wire cable. The strand is typically fixedly coupled to a fixed anchorage positioned at one end of the tendon, the so-called "fixed end", and is adapted to be stressed at the other anchor, the "stressing end" of the tendon. The strand is generally retained in each anchor by one or more wedges that engage a tapered recess in the anchor body so that when the strand is placed under tension, the wedges engage the strand more tightly.

One end of the strand extends through the stressing end anchor and out of the concrete body in which the anchor is embedded. In some cases, a pocket former is placed around the strand before the concrete is poured, which results in a pocket in the cured concrete. In these cases, the end of the strand extends through and outwardly from the pocket. Once the concrete has cured, a tensile force can be applied to the extending strand end, causing an elongation of the strand. Releasing the tensile force causes the strand to be more tightly gripped by the wedges, thereby maintaining its elongated stress, which is transferred to the concrete via the anchors. The portion of the strand that extends out of the stressing anchor is typically removed.

SUMMARY

The present disclosure provides for a strand cutter. The strand cutter includes a drive assembly and a clamp assembly mechanically coupled to the drive assembly. In addition, the strand cutter includes a nose piece, wherein the nose piece includes a nose piece body, a shoulder, a fixed blade receptacle and a rotating blade receptacle. Further, the strand cutter includes a fixed blade received in the fixed blade receptacle and a rotating blade assembly. The rotating blade assembly includes a cylindrical cutting body, a replaceable shear blade or a cutting edge, and a drive gear engagement coupled to or integrated with the cutting body. The rotating blade assembly is received in the rotating blade receptacle. The drive gear engagement engages the drive assembly so as to allow the transmission of torque from the drive assembly to the blade mount, the blade mount coupled to or integrally formed with the cutting body, The strand cutter also includes a flange plate, wherein the flange plate receives the shoulder, wherein the flange plate retains the nose piece in engagement to the drive assembly.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 9 is a side view of the rotating blade assembly of FIG. 8.

FIG. 10 is a cross-section along lines 10-10 of FIG. 9.

FIG. 11 is an enlarged view of a replaceable shear blade in accordance with an embodiment of the disclosure.

FIG. 12 is an enlarged view of a replaceable shear blade in accordance with an embodiment of the disclosure.

FIGS. 13 and 14 are isometric front and rear views, respectively, of a nose piece in accordance with an embodiment of the disclosure.

FIG. 15 is an isometric view of a flange plate for use with the embodiment of FIGS. 13 and 14.

DETAILED DESCRIPTION

Figure 1:
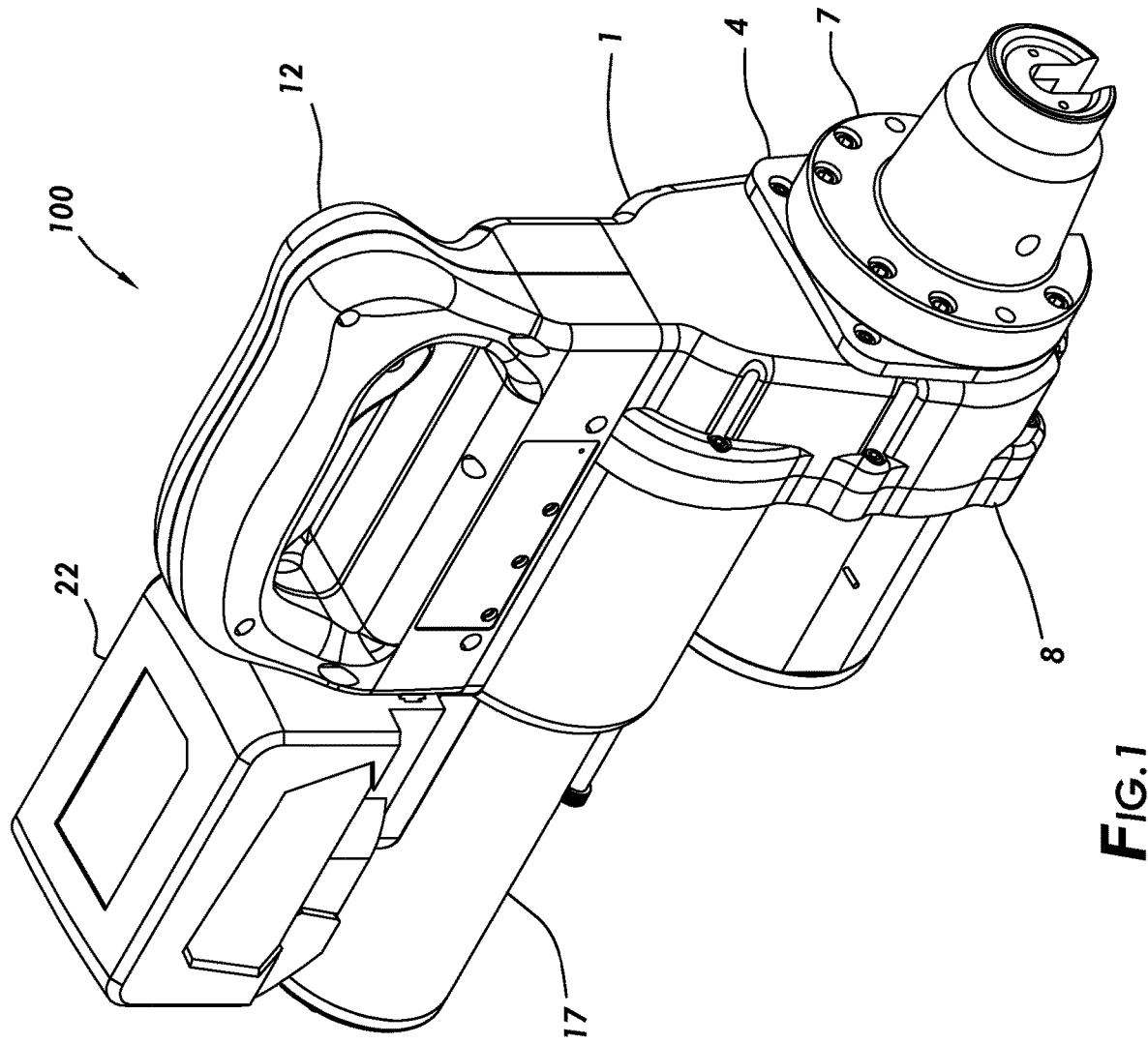
FIG. 1 is an isometric view of a strand cutter in accordance with an embodiment of the disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting.

In addition, the present disclosure may repeat reference numerals and/or letters in the various examples. This repetition is for the purpose of simplicity and clarity and does not in itself dictate a relationship between the various embodiments and/or configurations discussed.

The present disclosure provides a strand cutter for shearing post-tensioning cables, for example, in the field. Thus, the strand cutter is designed to operate adjacent to a post-tensioning anchor or within a pocket formed adjacent to a post-tensioning anchor. The strand is cut by receiving the strand eccentrically in a rotating blade assembly and rotating a replaceable shear blade relative to a fixed blade.

Figure 2:
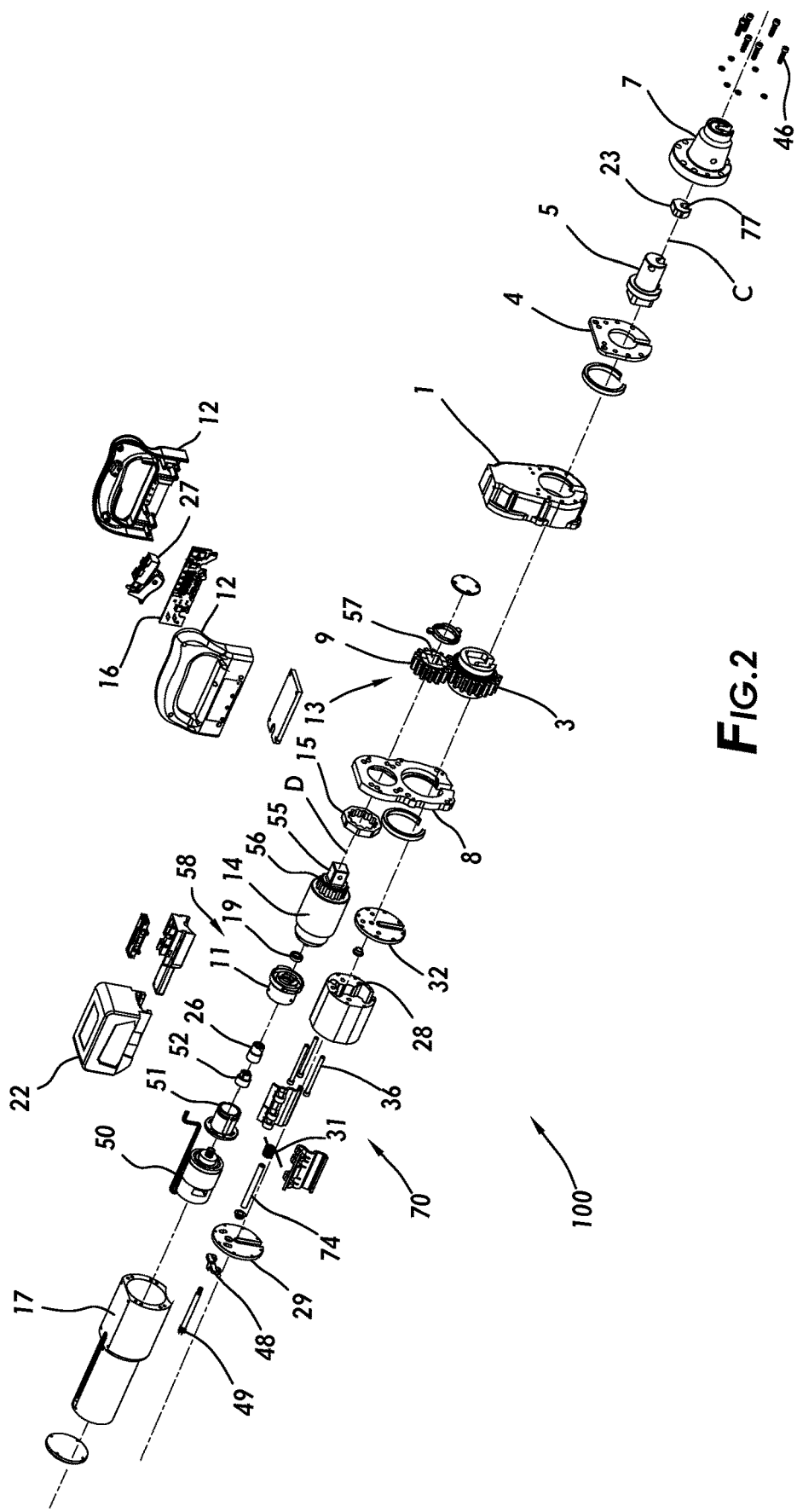
FIG. 2 is an isometric exploded view of the strand cutter of FIG. 1.

Referring to FIGS. 1 and 2, strand cutter 100 in accordance with the disclosure may include main drive housing 17. The top side of main drive housing 17 may support battery 22 and tool handle 12. Tool handle 12 may include trigger 27 and printed circuit board 16. Printed circuit board 16 may control the operation of strand cutter 100 in response to inputs that may include signals from trigger 27. Drive assembly 58, i.e., electric motor 50 and gear box 14 may be positioned within main drive housing 17. Electric motor 50 and gearbox 14 may be mechanically coupled and coaxial within main drive housing 17.

Strand cutter 100 may further include front housing 1 that is mechanically coupled to main drive housing 17. Front housing 1 may be affixed to gearbox 14 via mounting plate 8. Wear plate 4 may be mounted to the front of front housing 1 on a first side of wear plate 4. The second side of wear plate 4 may be mounted to nose piece 7. Nose piece 7, further described below, may define a cutting chamber. Front housing 1 may house primary drive gear 9 and secondary drive gear 3.

Figures 3, 4:
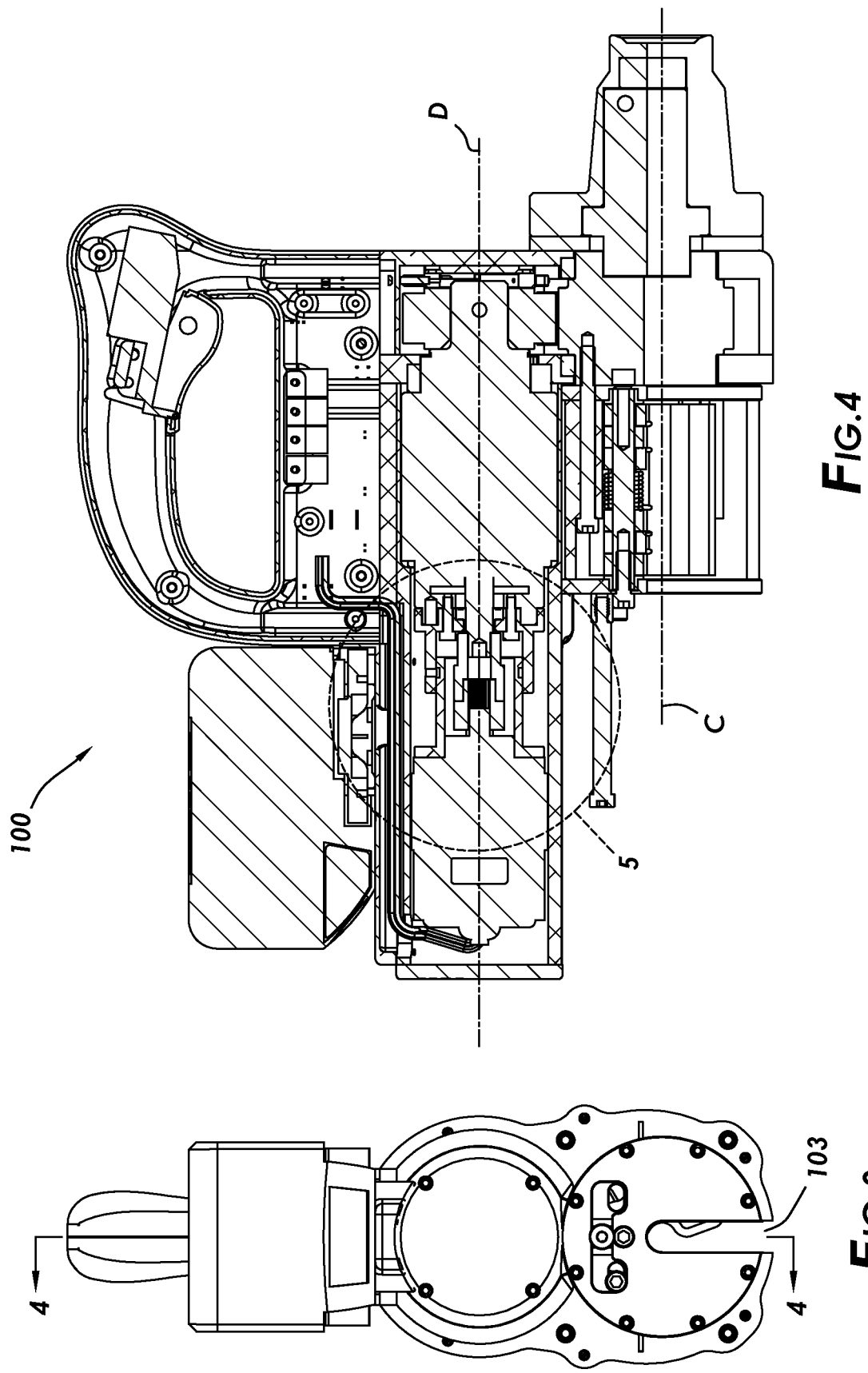
FIG. 3 is an end view of the strand cutter of FIG. 1.
FIG. 4 is a cross-section along lines 4-4 of FIG. 3.
Figure 5:
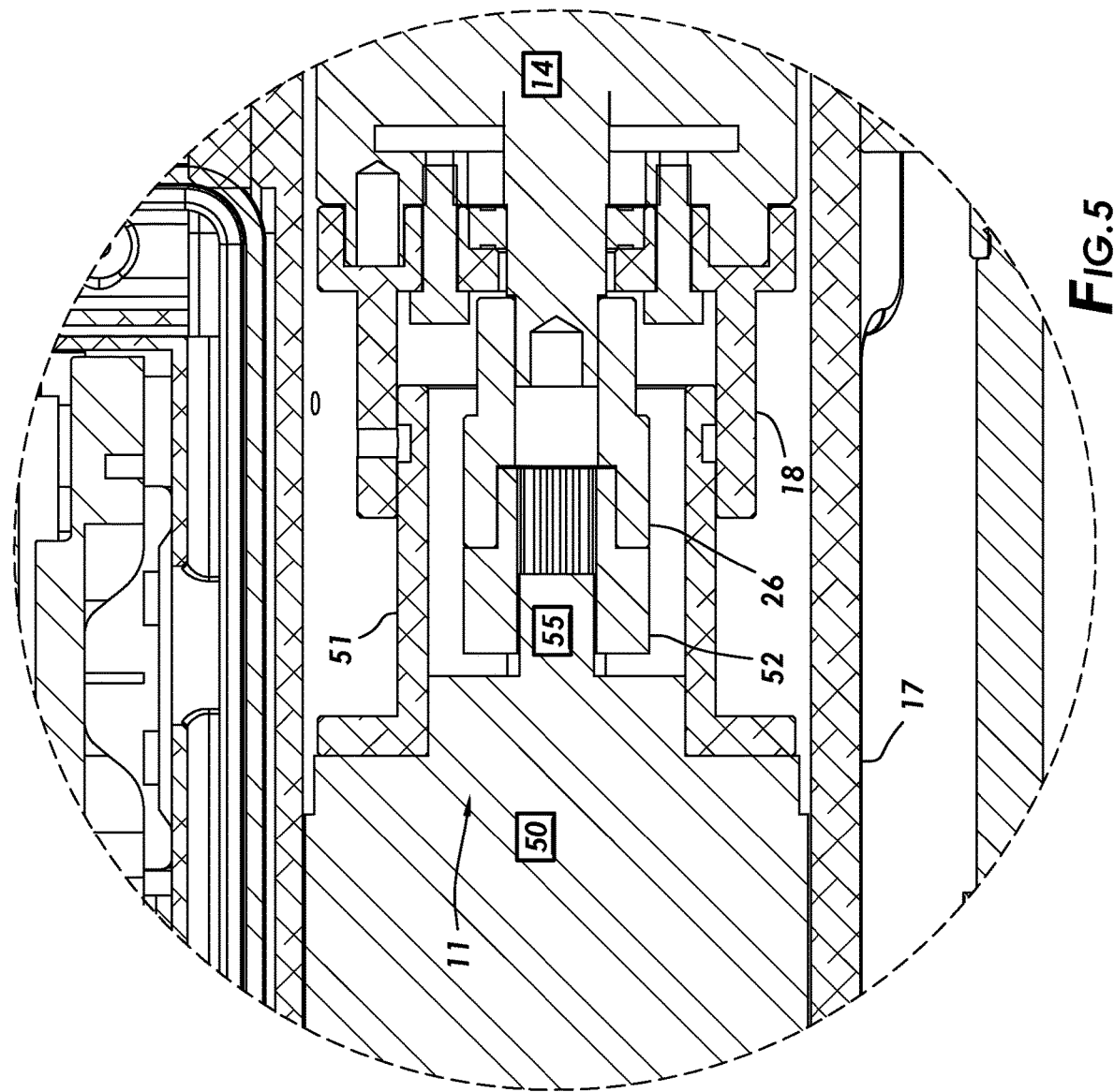
FIG. 5 is an enlarged view of a portion of FIG. 4.

Referring to FIGS. 4 and 5, drive assembly 58 for strand cutter 100 may be housed in main drive housing 17 and may include electric motor 50, gearbox 14, and gearbox connector assembly 11 that couples electric motor 50 to gearbox 14. Gearbox connector assembly 11 may include motor mount adaptor 51, motor shaft coupler 52, gearbox shaft coupler 26, gearbox to motor mount 18, and bearing 19.

Referring again to FIG. 2, male gearbox spline 56 and coaxial output shaft 55 may extend from gearbox 14. Male gearbox spline 56 may engage female gearbox spline 15. Female gearbox spline 15 may have a hexagonal or other non-round perimeter so as to engage a corresponding receptacle in mounting plate 8. Engagement of male and female gearbox splines 56, 15, and engagement of female gearbox spline 15 with mounting plate 8 may prevent drive assembly 58 from rotating relative to other components of strand cutter 100.

Drive gears 13, including primary drive gear 9 and secondary drive gear 3, transmit torque from electric motor 50 through gear box 14 to rotating blade assembly 5 (or 105). In certain embodiments, primary drive gear 9 may include drive opening 57 that corresponds to the shape of coaxial output shaft 55, allowing the transmission of torque from coaxial output shaft 55 to primary drive gear 9. Teeth on the perimeter of primary drive gear 9 engage corresponding teeth on the outside of secondary drive gear 3, allowing the transmission of torque from primary drive gear 9 to secondary drive gear 3. Rotating blade assembly 5 (or 105) is mechanically coupled to secondary drive gear 3 so as to be rotated thereby. Rotating blade assembly 5 may extend through openings in front housing 1, wear plate 4, and into the cutting chamber in nose piece 7. Fixed blade 23 is also received and non-rotatably retained in the cutting chamber of nose piece 7 adjacent to rotating blade assembly 5. Fixed blade 23 includes fixed strand slot 77.

Electric motor 50, motor shaft coupler 52, gearbox shaft coupler 26, gearbox to motor mount 18, gearbox 14, gearbox splines 56, 15, and primary drive gear 9 define drive axis D. Similarly, clamp housing 28, secondary drive gear 3, rotating blade assembly 5 and fixed blade 23 define cutting axis C.

Cutting Assembly

Figure 8:
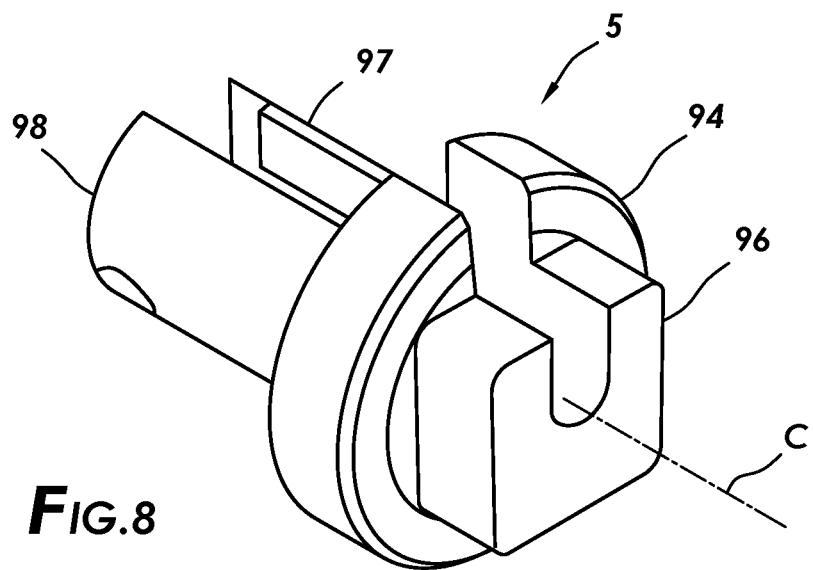
FIG. 8 is an isometric view of a rotating blade assembly in accordance with an embodiment of the disclosure.

Referring now to FIGS. 8-10, strand cutter 100 may include rotating blade assembly 5. Rotating blade assembly 5 may include mounting shoulder 94, drive gear engagement 96 mounted to mounting shoulder 94, and blade mount 97 mounted to mounting shoulder 94. Mounting shoulder 94 may be configured to rotate within front housing 1 and to support rotating blade assembly 5 within the strand cutter. Drive gear engagement 96 may be non-circular and may be configured to engage a corresponding opening in secondary drive gear 3, so as to allow the transmission of torque from secondary drive gear 3 to rotating blade assembly 5. Blade mount 97 may be generally cylindrical and may comprise an outer wall 98 and an inner shaft 99. Inner shaft 99 may include blade receptacle 101, pin opening 102, and strand slot portion 104. Blade receptacle 101 may receive replaceable shear blade 110. Pin opening 102 may receive a set screw or other fastener to retain replaceable shear blade 110 within blade receptacle 101. Strand slot portion 104 may align with throat 103.

Referring now to FIG. 11, replaceable shear blade 110 in accordance with some embodiments may include first drive face 112, second drive face 113, curved outer surface 116, and blade edge 114. Second drive face 113 and curved outer surface 116 may include chamfered edge 111. Drive faces 112, 113 engage corresponding surfaces in blade receptacle 101. Drive faces 112, 113 transmit torque from inner shaft 99 to replaceable shear blade 110. Inner shaft 99 may transmit a cutting torque to first drive face 112 (clockwise as shown in FIG. 11) during a cutting operation and may transmit an opening torque (counter-clockwise in FIG. 11) to second drive face 113 after a cut has been completed. In the illustrated embodiment, drive faces 112, 113 are planar and parallel, but drive faces 112, 113 may have any suitable configuration.

By way of example and without limitation, in some embodiments, replaceable shear blade 110 may have drive faces 115, 117, that are not parallel to cutting strand slot 120 and instead define an angle between 5 and 65 degrees with cutting strand slot 120, as shown in FIG. 12. In still other embodiments, replaceable shear blade 110 may have one drive face 115 or 117 instead of two. In some embodiments drive face 115 or 117 may extend between the bottom of cutting strand slot 120 and the outer circumference of inner shaft 99, as shown in FIGS. 11 and 12. In other embodiments drive face 115 or 117 may not extend to the outer circumference of inner shaft 99 or may not be a straight line.

Curved outer surface 116 may match the outer surface of outer wall 98 so as to provide a substantially continuous surface. To assemble rotating blade assembly 5, replaceable shear blade 110 may be positioned in blade receptacle 101 and secured with a fastener in pin opening 102. Blade edge 114 cooperates with strand slot portion 104 of inner shaft 99 to define a cutting strand slot 120 (FIG. 10) that is aligned with strand channel 92 and fixed strand slot 77 and may receive a strand for cutting.

Because replaceable shear blade 110 is removable from rotating blade assembly 5, replaceable shear blade 110 may be replaced when worn or damaged. Likewise, replaceable shear blade 110 may be selected from a variety of replaceable shear blades 110 of different materials or hardnesses, depending on the cutting application. In some embodiments, replaceable shear blade 110 may be accessed by removing nose piece 7 and removing the pin in pin opening 102.

U-shaped strand slots 120, 77 of rotating blade assembly 5 and fixed blade 23, respectively, are configured to receive a strand (cable) therein. The "bottom" or terminus of each U-shaped strand slot may be adjacent to cutting axis C. Fixed blade 23 and rotating blade assembly 5 are configured such that a strand positioned in the respective strand slots will be sheared when rotating blade assembly 5 has rotated 180° about cutting axis C. When cutting strand slot 120 of rotating blade assembly 5 is aligned with fixed strand slot 77 of fixed blade 23, i.e. at 0° of rotation, the tool is in a fully open position.

Clamp Assembly

Figure 6:
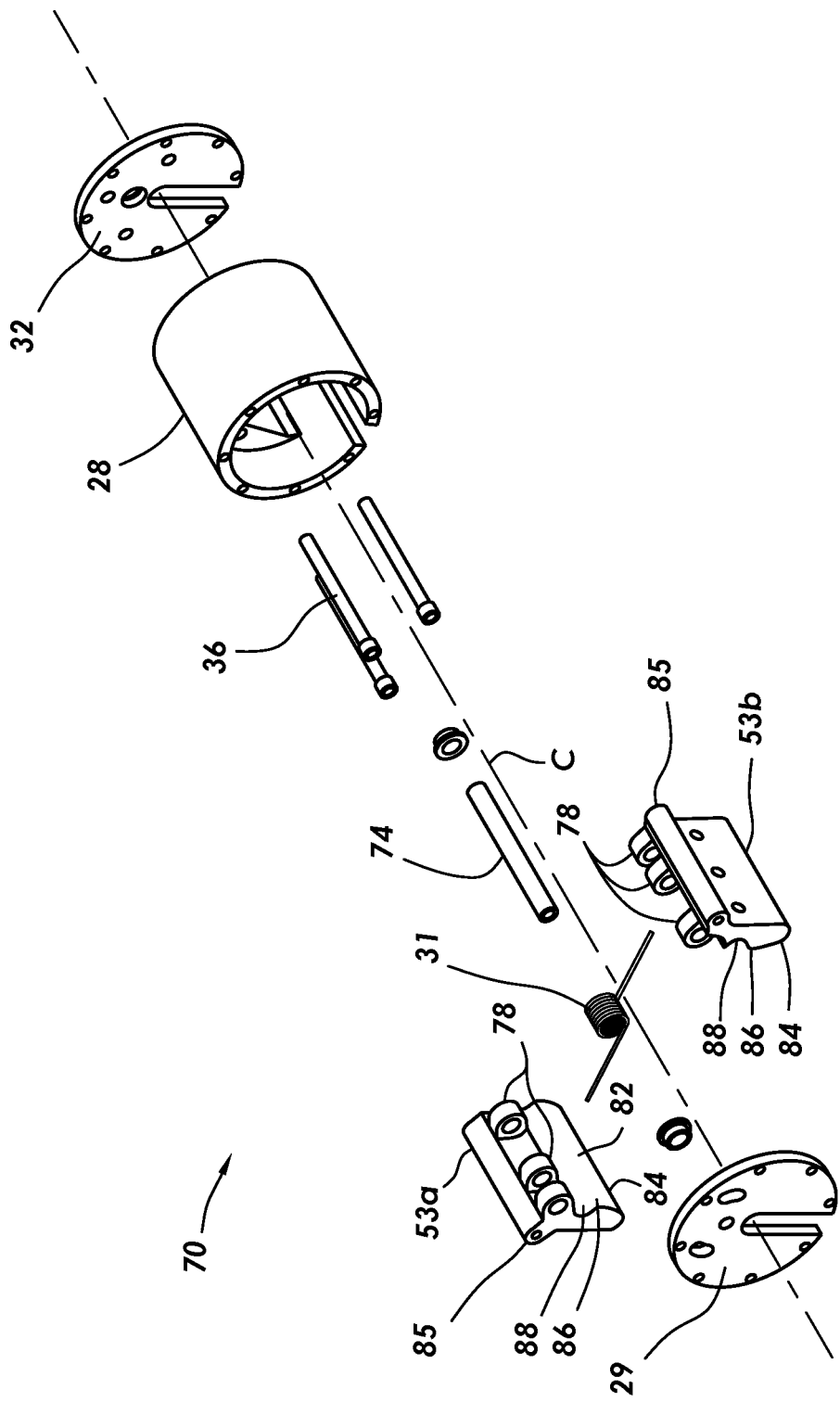
FIG. 6 is an isometric exploded view of a clamp assembly in accordance with an embodiment of the disclosure.

Referring to FIGS. 2 and 6, the strand cutter 100 may also include clamp assembly 70. Clamp assembly 70 is mechanically coupled to the drive assembly 58. In certain embodiments, clamp assembly 70 may include clamp housing 28 that is enclosed at one end by clamp cover plate 29 and at the other end by clamp mount plate 32. Housed within clamp housing 28 may be left and right clamp arms 53a, 53b, respectively (FIG. 6), pivot rod 74, torsion spring 31, and at least one clamp mounting screw 36. Clamp mounting screw(s) 36 may extend longitudinally through clamp housing 28 and through clamp mount plate 32. In some embodiments, the forward end(s) of clamp mounting screw(s) 36 may engage secondary drive gear 3 to allow clamp assembly 70 to rotate about cutting axis C in conjunction with rotating blade assembly 5.

Left and right clamp arms 53a, 53b each include shoulder 85 and one or more sleeves 78. In the illustrated embodiment, each clamp arm 53a, 53b has three sleeves 78, but the number of sleeves is a matter of design choice. Sleeves 78 are configured so that left and right clamp arms 53a, 53b may be positioned in an operational configuration in which sleeves 78 are coaxial and define a pivot axis. Pivot rod 74 may extend through sleeves 78. Torsion spring 31 may be positioned around pivot rod 74 such that one end of torsion spring 31 bears on each clamp arm 53a, 53b, thereby urging clamp arms 53a, 53b in opposite directions relative to pivot rod 74, resulting in a spring-loaded clamp assembly 70. Sleeves 78 may also be longitudinally spaced such that sleeves 78 on left clamp arm 53a interleave with sleeves 78 on right clamp arm 53b, allowing left and right clamp arms 53a, 53b to be longitudinally aligned.

Figure 7:
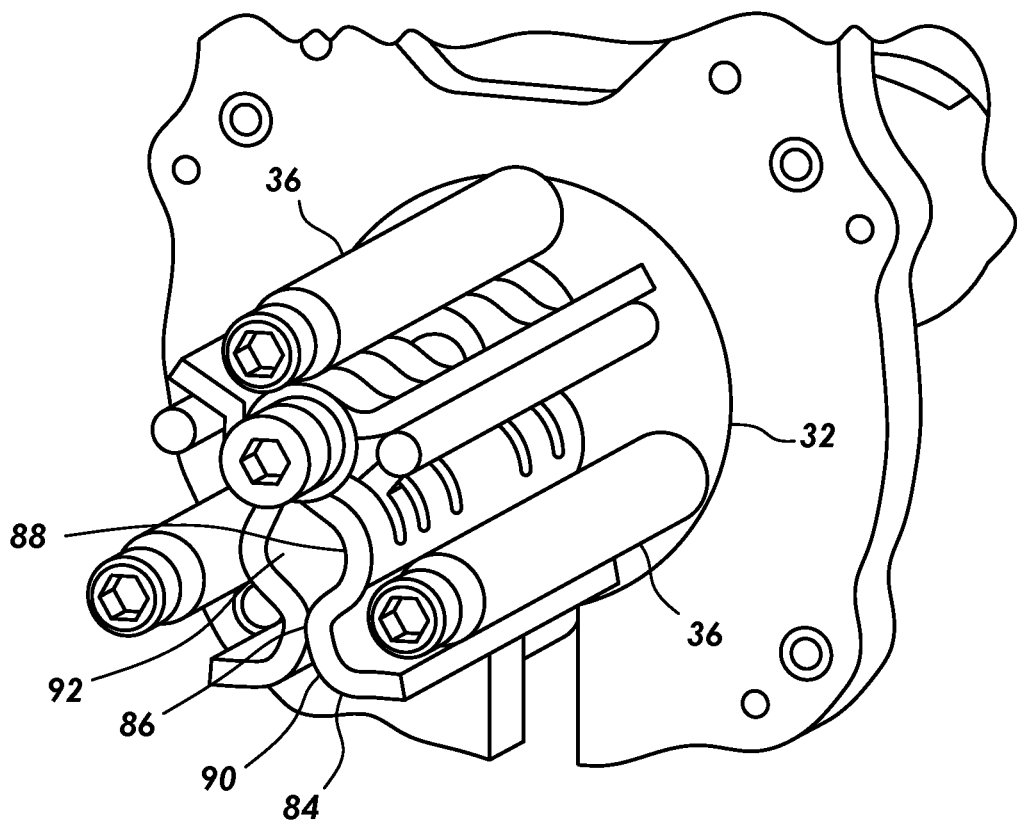
FIG. 7 is an isometric view of a portion of an assembled clamp assembly in accordance with an embodiment of the disclosure.

In addition to sleeves 78, left and right clamp arms 53a, 53b each include curved clamping face 82 that includes guide 84, neck portion 86, and strand-receiving groove 88. Each neck portion 86 may be positioned between guide 84 and strand-receiving groove 88. Referring to FIG. 7, when clamp assembly 70 is in an operational configuration, clamping faces 82 are urged toward each other by torsion spring 31. Guides 84 cooperate to define clamp entry 90 and stand-receiving grooves 88 cooperate to define strand channel 92. In some embodiments, neck portions 86 may bear on each other. Clamp entry 90 and strand channel 92 may be parallel with cutting axis C.

Strand cutter 100 may cut a strand at a predetermined point on the strand without requiring the strand to be threaded into a cutting device. Strand cutter 100 is provided with a throat 103, such as shown in FIG. 3. Throat 103 may include a groove or slot that extends along a bottom surface of the strand cutter 100. Throat 103 provides for a strand to be received into clamp assembly 70 and strand slots 77, 120, laterally, i.e. by moving strand cutter 100 in a direction normal to the strand and normal to cutting axis C, so that cutting axis C moves toward the strand, rather than threading the strand through a closed opening along cutting axis C.

In some embodiments, throat 103 may be formed by providing a strand-receiving slot in each of the components along cutting axis C. Thus, clamp assembly 70, mounting plate 8, secondary drive gear 3, front housing 1, wear plate 4, rotating blade assembly 5, fixed blade 23, and nose piece 7 may each include a strand-receiving slot. For clamp assembly 70, clamp housing 28, clamp cover plate 29, and clamp mount plate 32 each include a strand-receiving slot, so that a strand may enter clamp assembly 70 laterally. Similarly, in mounting plate 8, secondary drive gear 3, front housing 1, wear plate 4, and nose piece 7, the respective strand-receiving slots are configured to receive a strand and to align with the strand slots when the tool is in an open position. For fixed blade 23 and rotating blade assembly 5, the strand-receiving slots are shown as strand slots 77 and 120, i.e. the slots whose relative rotation results in cutting of the strand. The throat-forming strand-receiving slots are aligned and configured such that a strand may be positioned on cutting axis C by placing strand cutter 100 onto a strand laterally.

In some embodiments, as strand cutter 100 is placed on a strand, the strand enters throat 103. As the strand moves into spring-loaded clamp assembly 70, the strand will enter clamp entry 90 and will bear on neck portions 86. Applying to strand cutter 100 an engagement force normal to the strand will cause the strand to push neck portions 86 apart. Application of a sufficient engagement force will overcome the opposing force of torsion spring 31, allowing clamping arms 53a, 53b, to rotate about pivot rod 74 and allow the strand to enter strand channel 92. Once the strand is received in strand channel 92, torsion spring 31 urges clamping arms 53a, 53b, to rotate back to a closed position in which the strand is retained in strand channel 92 by neck portions 86.

In some embodiments, because no separate operation is required in order to fix a strand in strand cutter 100 in a preparation for cutting, an operator's hands can be used for positioning and operating the strand cutter and can remain clear of the strand and the cutting zone.

In some embodiments, a clamp opener 48 may work in conjunction with pin 49 that extends through clamp housing 28 into engagement with clamp arms 53a and/or 53b to enable clamp assembly 70 to be opened manually instead of by applying an opening force via a strand.

Referring now to FIGS. 13-16, in certain embodiments, nose piece 7, as shown in FIGS. 1 and 2, is replaced with a two-piece nose piece assembly that includes generally cylindrical nose piece 210 and flange plate 230, i.e., the combination of FIGS. 13 and 15. Nose piece 210 may include pocket engagement section 212 coupled or formed integrally with nose piece body 216, which is coupled to or formed integrally with shoulder 224. Pocket engagement section 212 may include forward lip 211 and recessed face 214. Pocket engagement section 212 may also include fixed blade receptacle 218 for receiving fixed blade 23 (FIG. 2). Pocket engagement section 212 may also include one or more extraction holes 215 extending through recessed face 214 and into fixed blade receptacle 218 for facilitating removal of fixed blade 23 from fixed blade receptacle 218. The inner wall of fixed blade receptacle 218 and the outside of fixed blade 23 correspond in shape and may each have a square, hexagonal, or other non-round shape to facilitate the transmission of torque to fixed blade 23 and may prevent rotation of fixed blade 23 within nose piece 210. Nose piece 210 has a longitudinal nose piece axis N.

Nose piece body 216 may be frustoconical or may be generally cylindrical as illustrated and may include an eccentric bore that defines a rotating blade receptacle 219. Rotating blade receptacle 219 may be generally cylindrical with a longitudinal axis R that is parallel to but offset from nose piece axis N. Rotating blade receptacle 219 is configured to receive and support a rotating blade assembly such as rotating blade assembly 5 or rotating blade assembly 105 described below.

Shoulder 224 of nose piece 210 may have generally circular circumferential face 223. Circumferential face 223 may have a diameter greater than the diameter of nose piece body 216 and may include at least one flat 225. In the embodiment illustrated in FIGS. 13 and 14, circumferential face 223 includes two parallel flats 225; in other embodiments shoulder 224 may include more than two flats 225 or may have a non-circular shape, such as square or hexagonal. Shoulder 224 may be integrally formed with nose piece 210.

Referring to FIG. 15, flange plate 230 may be generally circular and may include retaining face 232 having lip 234 extending longitudinally therefrom. The longitudinal extent of lip 234 may be substantially equal to the thickness of shoulder 224. Retaining face 232 may include eccentric opening 237 that is sized and configured to receive nose piece body 216 therethrough. Eccentric opening 237 may be sized to prevent or restrict the passage of shoulder 224 therethrough, whereby flange plate 230 may be used to retain nose piece 210 in a desired position. The inner surface of lip 234 may include flats 235 configured to correspond to and engage with flats 225 on nose piece 210. Engagement of flats 235 with 225 on nose piece 210 may help prevent rotation of nose piece 210 relative to flange plate 230. The combination of fasteners 46 affixing flange plate 230 to strand cutter 100 and engagement of flats 235 with flats 225 serves to non-rotatably couple nose piece 210 to front housing 1 and to place rotating blade assembly 105 into engagement with drive assembly 58.

Flange plate 230 and nose piece 210 may each include a slot that is configured to align with slots in the other components of strand cutter 100 and form part of throat 103.

Figure 17:
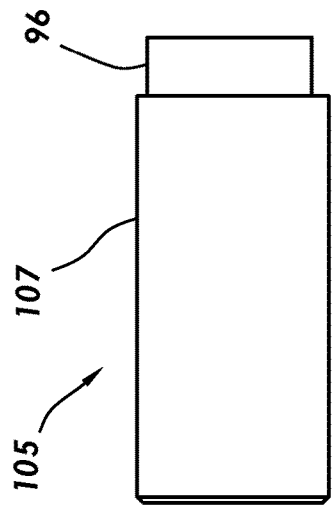
FIGS. 17 and 18 are side and isometric views of a rotating blade assembly for use with an alternate embodiment of the disclosure.
Figure 16:
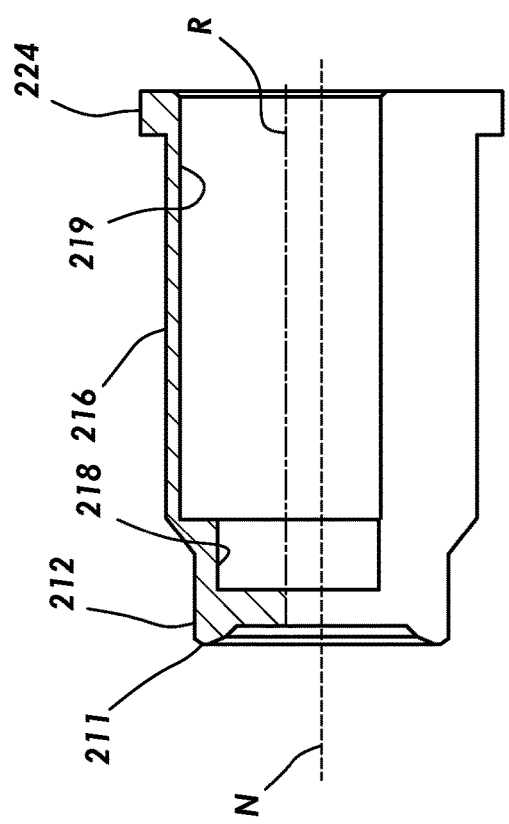
FIG. 16 is a cross-sectional side view of the nose piece of FIG. 13.
Figure 18:
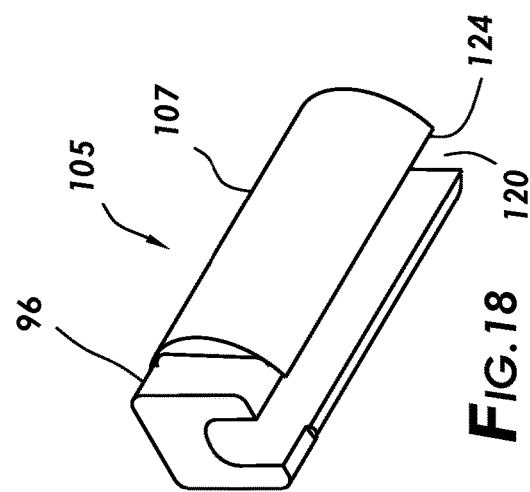

Referring now to FIGS. 17 and 18, in certain embodiments, rotating blade assembly 105 may include cutting body 107 coupled to or integrally formed with drive gear engagement 96 and blade mount 97. Rotating blade assembly 105 may be configured to rotate within and relative to rotating blade receptacle 219 in nose piece 210. Drive gear engagement 96 may be non-circular protuberance coupled to or formed integrally with cutting body 107 and engages a corresponding opening in secondary drive gear 3, so as to allow the transmission of torque from secondary drive gear 3 to rotating blade assembly 5. Cutting body 107 may be generally cylindrical. Cutting body 107 may in some embodiments include blade edge 124 or, in other embodiments, replaceable shear blade 110 as described above. Like rotating blade assembly 5, rotating blade assembly 105 may include cutting strand slot 120. Cutting strand slot 120 aligns with throat 103 when the tool is in an open position and ready to receive a strand therein.

To assemble, rotating blade assembly 105 may be placed into rotating blade receptacle 219 in nose piece 210. Nose piece 210 may be assembled into flange plate 230 such that nose piece body 216 extends through eccentric opening 237 and shoulder 224 is received in lip 234 such that flats 225 engage flats 235. The assembled components 230, 210, and 105 can be assembled with the other components of strand cutter 100 by affixing flange plate 230 to front housing 1.

Operation

To cut a strand with strand cutter 100, strand cutter 100 is placed onto the strand at the desired location along the strand. Throat 103 is aligned with the strand and strand cutter 100 is advanced toward the strand until the strand passes through the neck of clamp assembly 70 and is received in strand channel 92. Provided the components of strand cutter 100 are properly aligned and the tool is in the open configuration, the strand will also be received in strand slots 120 and 77.

Actuation of trigger 27 will cause power to flow from battery 22 to electric motor 50. Electric motor 50 will output torque that is transmitted via gearbox 14 and coaxial output shaft 55 to primary drive gear 9, which transmits the torque to secondary drive gear 3. Secondary drive gear 3 in turn transmits torque to rotating blade assembly 5 (or 105). In response, rotating blade assembly 5, including replaceable shear blade 110, rotates relative to strand cutter 100. Because fixed blade 23 is non-rotatably mounted to the device, rotating blade assembly 5, including replaceable shear blade 110, rotates relative to fixed blade 23, thereby shearing the strand. When rotating blade assembly 5 has rotated 180° relative to fixed blade 23, the strand will be completely cut. The strand cutter 100 can then be removed from the strand and the rotating blade assembly can be returned to the open position, in which cutting strand slot 120 aligns with throat 103.

In the event that any component in nose piece 210, including fixed blade 23, rotating blade assembly 5, rotating blade assembly 105, or nose piece 210 itself, breaks, becomes dull or otherwise needs replacement, flange plate 230 can be decoupled from strand cutter 100 and the necessary component replaced with a new component. Replacement is quick and easy and does not require disassembly of the rest of strand cutter 100.

What is claimed is:

1. A strand cutter, comprising a drive assembly; a clamp assembly mechanically coupled to the drive assembly; and a rotating shear blade assembly, wherein the rotating shear blade assembly includes a drive gear engagement, a rotatable blade mount, and a shear blade, wherein the drive gear engagement is adapted to engage the drive assembly so as to allow the transmission of torque from the drive assembly to the rotatable blade mount, wherein the rotatable blade mount includes a blade receptacle, and wherein the blade receptacle is configured to receive the shear blade;
   wherein the strand cutter further comprises a fixed blade that does not rotate relative to the strand and wherein the shear blade is configured to rotate relative to the fixed blade to shear a strand.

2. The strand cutter of claim 1 wherein the shear blade includes two drive faces.

3. The strand cutter of claim 2 wherein the two drive faces are planar and parallel.

4. The strand cutter of claim 2 wherein the rotatable blade mount further includes a strand slot portion and wherein the shear blade cooperates with the strand slot portion to define a cutting strand slot.

5. The strand cutter of claim 4, wherein the fixed blade includes a fixed strand slot, and wherein the strand cutter has an open position in which the cutting strand slot aligns with the fixed strand slot.

6. The strand cutter of claim 5 wherein the rotatable blade mount includes an inner shaft having an outer circumference and wherein at least one of the two drive faces extends between the bottom of the cutting strand slot and the outer circumference of the inner shaft.

7. The strand cutter of claim 5 wherein the strand cutter includes a throat configured to receive a strand, and wherein the cutting strand slot aligns with the throat in the open position, whereby to position a strand in the strand cutter the strand cutter is configured to move laterally relative to the strand.

8. The strand cutter of claim 1 wherein the clamp assembly includes left and right clamp arms, a pivot rod, and a torsion spring, wherein the left and right clamp arms are pivotably mounted on the pivot rod and wherein the torsion spring urges the left and right clamp arms in opposite directions to open about the pivot rod to allow the strand to enter and then urge the clamp arms together to retain the strand.

9. The strand cutter of claim 8 wherein the left and right clamp arms each include a curved clamping face that includes a guide portion, a neck portion, and a strand-receiving groove.

10. The strand cutter of claim 9 wherein the clamp assembly has a closed position in which the neck portions of the left and right clamp arms bear on each other.

11. The strand cutter of claim 8 wherein the guide portions of the left and right clamp arms cooperate to define a clamp entry and the strand-receiving grooves of the left and right clamp arms cooperate to define a strand channel.

12. The strand cutter of claim 11 wherein the strand cutter includes a throat configured to receive a strand, and wherein the clamp entry aligns with the throat in the open position, whereby to position a strand in the strand cutter the strand cutter is configured to move laterally relative to the strand.

13. The strand cutter of claim 1, further comprising:
   a strand clamp, comprising:
      a clamp housing;
      a right clamp arm;
      a left clamp arm; and
      a spring configured to urge the right and left clamp arms together around a strand axis; wherein:
      the right and left clamp arms are configured to cooperate to define: (a) a strand channel between opposing strand-receiving groove faces on the right and left clamp arms, the strand channel being parallel to the strand axis, and (b) a clamp entry between opposing guide faces on the right and left clamp arms; and
   a cover plate configured to enclose the strand clamp at a distal end.

* * * * *